US006614752B1

United States Patent
Parrish et al.

(10) Patent No.: US 6,614,752 B1
(45) Date of Patent: Sep. 2, 2003

(54) TRANSITIONING A STANDARDS-BASED CARD INTO A HIGH AVAILABILITY BACKPLANE ENVIRONMENT

(75) Inventors: Brent K. Parrish, Hollis, NH (US); Michael J. Taylor, Pepperell, MA (US); Michael P. Colton, Danville, NH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/328,172

(22) Filed: Jun. 8, 1999

(51) Int. Cl.[7] .............................................. H04L 12/24
(52) U.S. Cl. ........................... 370/217; 370/225; 714/2; 714/25
(58) Field of Search ................................ 370/217, 218, 370/219, 220, 221, 227, 243, 244, 245, 248, 249, 250, 251, 252, 225, 228; 340/825.06, 825.16; 714/2, 5, 10, 25, 30, 43, 44; 710/313, 314

(56) References Cited

U.S. PATENT DOCUMENTS

| | | | |
|---|---|---|---|
| 4,787,081 A | * 11/1988 | Waters et al. ................. 370/85 |
| 5,059,925 A | 10/1991 | Weisbloom .................. 331/1 A |
| 5,255,291 A | 10/1993 | Holden et al. ............... 375/111 |
| 5,519,704 A | 5/1996 | Farinacci et al. ......... 370/85.13 |
| 5,742,649 A | 4/1998 | Muntz et al. ................ 375/371 |
| 5,787,070 A | 7/1998 | Gupta et al. ................. 370/217 |
| 5,793,987 A | 8/1998 | Quackenbush et al. ..... 395/280 |
| 5,809,021 A | * 9/1998 | Diaz et al. ................... 370/364 |
| 5,812,618 A | 9/1998 | Muntz et al. ................ 375/372 |
| 5,822,383 A | 10/1998 | Muntz et al. ................ 375/362 |
| 5,835,481 A | 11/1998 | Akyol et al. ................. 370/216 |
| 6,154,465 A | * 11/2000 | Pickett ........................ 370/466 |
| 6,240,087 B1 | * 5/2001 | Cummings et al. ......... 370/360 |
| 6,359,858 B1 | * 3/2002 | Smith et al. ................. 370/217 |
| 6,430,636 B1 | * 8/2002 | Cranston et al. ............ 710/107 |

* cited by examiner

*Primary Examiner*—Steven Nguyen
*Assistant Examiner*—Duc Duong
(74) *Attorney, Agent, or Firm*—Baker Botts L.L.P.

(57) ABSTRACT

A telecommunications device includes a backplane having an associated high availability backplane environment. A transition card coupled to the backplane helps transition a standards-based card supporting a Peripheral Component Interconnect (PCI) administrative bus into the high availability backplane environment. The transition card may also help transition either a Computer Telephony or a Serial Telephony serial data bus into the high availability backplane environment. In a more particular embodiment, the transition card may support a control bus, a synchronization bus, a reset bus, an isolate bus, and a power bus that each support at least one high availability characteristic not associated with the PCI bus. In another more particular embodiment, the transition card may provide at least some redundancy, hot insertion, fault detection, fault isolation, and fault recovery capabilities not associated with the PCI bus.

41 Claims, 3 Drawing Sheets

TRANSITIONING A STANDARDS-BASED CARD INTO A HIGH AVAILABILITY BACKPLANE ENVIRONMENT

RELATED APPLICATIONS

This application is related to:

U.S. application Ser. No. 09/328,171 for a "LOCAL AREA NETWORK AND MESSAGE PACKET FOR A TELECOMMUNICATIONS DEVICE," filed Jun. 8, 1999, currently pending;

U.S. application Ser. No. 09/328,038 for a "HIGH AVAILABILITY LOCAL AREA NETWORK FOR A TELECOMMUNICATIONS DEVICE," filed Jun. 8, 1999, now U.S. Pat. No. 6,425,009;

U.S. application Ser. No. 09/327,700 for a "TDM SWITCHING SYSTEM AND ASIC DEVICE," filed Jun. 8, 1999, currently pending;

U.S. application Ser. No. 09/327,971 for a "PROTECTION BUS AND METHOD FOR A TELECOMMUNICATIONS DEVICE," filed Jun. 8, 1999 by, currently pending;

U.S. application Ser. No. 09/328,173 for a "EVENT INITIATION BUS AND ASSOCIATED FAULT PROTECTION FOR A TELECOMMUNICATIONS DEVICE," filed Jun. 8, 1999, now U.S. Pat. No. 6,434,703;

U.S. application Ser. No. 09/328,031 for a "FRAME SYNCHRONIZATION AND FAULT PROTECTION FOR A TELECOMMUNICATIONS DEVICE," filed Jun. 8, 1999, currently pending; and U.S. application Ser. No. 09/330,433 for a "CLOCK SYNCHRONIZATION AND FAULT PROTECTION FOR A TELECOMMUNICATIONS DEVICE," filed Jun. 8, 1999, currently pending.

TECHNICAL FIELD OF THE INVENTION

This invention relates generally to the field of telecommunications, and more particularly to transitioning a standards-based card into a high availability backplane environment.

BACKGROUND OF THE INVENTION

Many telecommunications devices include backplanes for transmitting digital information between components of the devices. For example, a telecommunications switching system might include a backplane and associated data bus for transmitting digital data representing voice or data signals between cards associated with incoming and outgoing ports. Typically, such a system would also include a bus to allow these cards to communicate appropriate commanded, control, and administrative information with each other and with other components during operation of the system. Successful operation of the system will in many instances depend heavily on the ability of these communications mechanisms to satisfy the typically stringent availability, bandwidth, flexibility, and other requirements placed on the system.

As the telecommunications industry continues to dominate the growth of the global economy, satisfying availability, bandwidth, flexibility, and other requirements placed on switching and other telecommunications systems has become increasingly important. High availability may be generally considered as exceeding 99.999 percent availability, amounting to less than approximately five minutes of "down time" during each year of operation, and generally: requires that a system be able to detect and to autonomously handle certain faults, such as total or partial failure of a card, without immediate human intervention. Providing high availability is often a de facto if not explicit competitive requirement for many telecommunications manufacturers.

However, standards-based communications techniques are inadequate to meet requirements placed on many high availability systems. For example only and without limitation, data buses based on the Computer Telephony (CT) bus structure specified in the Enterprise Computer Telephony Forum (ECTF) H.110 standard, on a MITEL Serial Telephony (ST) bus structure, or on other serial data bus structures are inadequate for high availability applications. Similarly, command, control, and administrative buses based on a Peripheral Component Interconnect (PCI) or on a compact PCI (cPCI) bus structure lack one or more attributes important within a high availability backplane environment. Among other deficiencies, none of these buses provides an appropriate combination of redundancy, hot insertion, fault detection, fault isolation, and fault recovery. Standardsbased and other off-the-shelf cards generally provide the benefits associated with widespread commercial availability; including reduced cost relative to custom solutions. However, because such cards often include a data bus, a command, control, and administrative bus, or both types of data buses based on the bus structures discussed above, standards-based cards have been unsuitable for operation within high availability backplane environments of modern telecommunications systems.

SUMMARY OF THE INVENTION

According to the present invention, the disadvantages and problems associated with operation of standards-based cards within high availability backplane environments have been substantially reduced or eliminated.

According to one embodiment of the present invention, a telecommunications device includes a backplane with an associated high availability backplane environment. A transition card coupled to the backplane transitions a standards-based card supporting a Peripheral Component Interconnect (PCI) administrative bus into the high availability backplane environment. The transition card may also help transition either a Computer Telephony or a Serial Telephony serial data bus into the high availability backplane environment. In a more particular embodiment, the transition card may support a control bus, a synchronization bus, a reset bus, an isolate bus, and a power bus that each support at least one high availability characteristic not associated with the PCI bus. In another more particular embodiment, the transition card may provide at least some redundancy, hot insertion, fault detection, fault isolation, and fault recovery capabilities not associated with the PCI bus.

The present invention provide a number of important technical advantages. Unlike data buses based on a CT or ST bus structure, unlike command, control, and administrative buses based on a PCI bus structure, and unlike other standards-based buses, the buses and associated operation of the present invention provide a suitable combination of redundancy, hot insertion, fault detection, fault isolation, and fault recovery, making them collectively appropriate for use in high availability backplane environments. According to the present invention, standards-based and other off-the-shelf cards are readily transitioned into a high availability backplane environment to provide benefits of standardsbased cards, such as widespread commercial availability and reduced cost, without sacrificing high availability characteristics. With the present invention, faults that arise in connection with standards-based cards and their buses are detected, isolated, and responded to such that the faults are prevented from propagating to other components in the system. Unaffected components may continue operating substantially uninterrupted and maintaining substantial data integrity despite the fault. As a result of these and other important technical advantages, the present invention is particularly well suited for incorporation in a variety of switching and other modern telecommunications devices.

BRIEF DESCRIPTION OF THE DRAWINGS

To provide a more complete understanding of the present invention and further features and advantages thereof, reference is now made to the following description taken in conjunction with the accompanying drawings, in which.

DETAILED DESCRIPTION OF THE INVENTION

Figure 1:
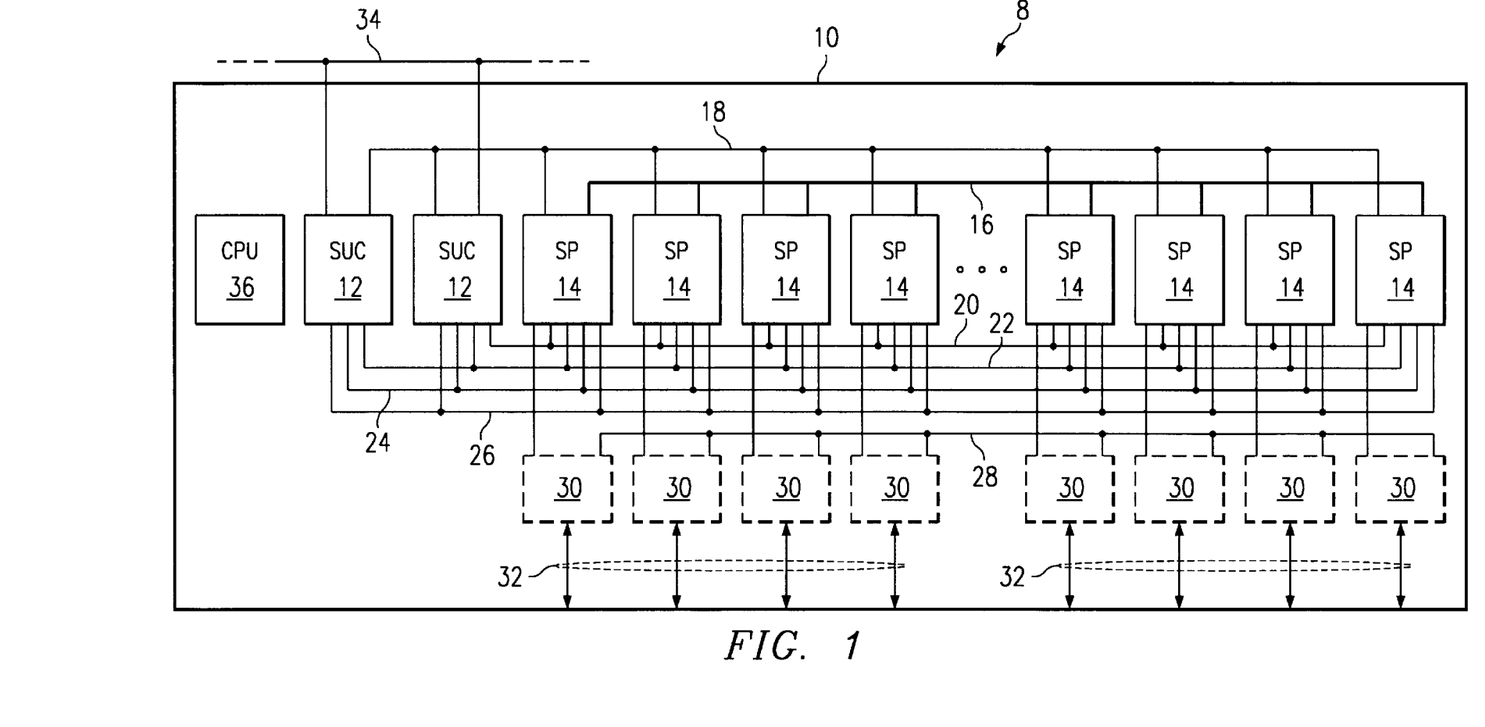
FIG. 1 illustrates an exemplary system including at least one switching unit according to the present invention.

FIG. 1 illustrates an exemplary system 8 that includes one or more switching units 10. In one embodiment, each: switching unit 10 is a programmable switching unit that switches time division multiplexed (TDM), packet-based, or other suitable digital signals associated with voice, data, or other appropriate traffic between incoming and outgoing ports, lines, trunks, or other suitable telecommunications network interfaces. In general, switching unit 10 may operate at least in part subject to control of suitable software within one or more associated host computers and may be coupled to such host computers using one or more suitable communications links. Although switching unit 10 is discussed, those skilled in the art appreciate that the present invention may apply similarly to a wide variety of other telecommunications devices and that the present invention encompasses all such applications.

In one embodiment, switching unit 10 includes two or more redundant switching unit controllers (SUC) 12 coupled: to one another and to multiple service providers (SP) 14 using one or more suitable buses. Each switching unit controller 12 and each service provider 14 is a card supporting appropriate integrated circuits, buses, circuitry, and any other suitable electrical components and may be shelf-mounted, rack-mounted, or otherwise removably installed within switching unit 10 in accordance with particular needs. Switching unit controllers 12 generally cooperate to control selected aspects of the operation of service providers 14 and other components within switching unit 10. Service providers 14 communicate digital signals with one another using a backplane, midplane, or other switching fabric 16 that in a particular embodiment supports up to 16,384 time slots, corresponding to as many as 16,384 ports associated with switching unit 10.

Service providers 14 generally communicate between backplane 16 and suitable network interfaces to allow switching unit 10 to communicate information with and to switch the digital signals associated with these interfaces. Service providers 14 may also support signaling, integrated voice response, and other suitable service functionality. Service providers 14 may communicate with network interfaces of a single or multiple types, for example only and without: limitation, T1 interfaces, E1 interfaces, Integrated Services Digital Network (ISDN) interfaces, Signaling System No. 7 (SS7) interfaces, Optical Carrier level-3 (OC-3) or other optical interfaces, or other suitable interfaces, in any suitable combination. Service providers 14 may have a peer-to-peer or any suitable hierarchical relationship. Some or all switching unit controllers 12 and service providers 14 may be hot insertable, hot pluggable, hot swappable, or otherwise readily replaceable during operation of switching unit 10 to support high availability requirements.

In general, switching unit controllers 12 and service providers 14 use control bus 18 to communicate suitable command, control, and administrative messages during the operation of switching unit 10. Control bus 18 and its associated physical layer protocol provide a local area network that couples switching unit controllers 12 and service providers 14 within the backplane environment of switching unit 10, which may be a high availability backplane environment. Control bus 18 and its operation are described more fully in U.S. Pat. No. 6,425,009 and copending U.S. application Ser. No. 09/328,171. In addition to control bus 18, switching unit controllers 12 and service providers 14 may be coupled to one another using a suitable combination of synchronization bus 20, reset bus 22, isolation bus 24, and power bus 26. A system clock signal provides a "heartbeat" or timing reference for synchronous communications among switching unit controllers 12 and service providers 14 using backplane 16, control bus 18, synchronization bus 20, reset bus 22, isolate bus 24, and power bus 26 within the high availability backplane environment of switching unit 10. As described more fully below, these buses and their operation cooperate to support high availability requirements, providing an important technical advantage.

Associated with service providers 14 are input/output (I/O) modules 30 that in general support incoming and outgoing communications between service providers 14 and associated network interfaces using associated links 32. Protection bus 28 couples I/O modules 30 and operates in cooperation with other components of switching unit 10 to provide protection switching and other capabilities generally desirable in preventing a single point of failure from propagating within switching unit 10 and in satisfying high availability requirements. A suitable protection technique involving protection bus 28 is described more fully in copending U.S. application Ser. No. 09/327,971. One or more central processing units (CPU) 36 support appropriate software and cooperate with components of switching unit 10 to facilitate switching and other operations within switching unit. 10. Where appropriate, reference to CPU 36 includes reference to some or all associated software unless otherwise indicated. Moreover, CPU 36 may include multiple CPUs, microprocessors, or other suitable computers distributed, in whole or in part, among some or all cards within switching unit 10.

In one embodiment, switching unit controllers 12 and service providers 14 each include an application specific integrated circuit (ASIC) complex to control some or all of the operations of switching unit: controller 12 or service provider 14 with respect to TDM switching, clock synchronization, frame synchronization, and corresponding fault detection, isolation, and recovery, among other appropriate responsibilities. Each ASIC complex may include one or more ASIC devices each providing the same, partially overlapping, or different functionality than one or more other ASIC devices within the ASIC complex. In a particular embodiment, the ASIC complex within each switching unit controller 12 supports a single ASIC device and the ASIC complex within each service provider 14 supports up to five ASIC devices, depending in general on the number of ports associated with switching unit 10 and any other suitable factors. For example, where switching unit 10 supports 16,384 ports, each ASIC device within the ASIC complex of each service provider 14 may be associated with a specified range of 4,096 ports, switching incoming data from and outgoing data to these associated ports. CPU 36 and associated software may cooperate with one or more ASIC complexes to facilitate operation of the present inventions within switching unit 10.

One or more switching unit controllers 12 within a particular switching unit 10 may be coupled using network 34 to one or more switching unit controllers 12 within other switching units 10, one or more associated host computers, or one or more other network components, in any suitable combination. Network 34 may be a shared or dedicated local area network (LAN) supporting Ethernet or any other communications protocol, a suitable wide area network (WAN), or any other appropriate network. In one embodiment, network 34 supports a secure 100BaseT Ethernet link and one or more higher level protocols, for example, TCP/IP (Transmission Control ProtocoUInternet Protocol), UDP/IP (User Datagram Protocol/Internet Protocol), or another appropriate protocol. A service provider 14 needing to communicate with a service provider 14 located in another switching unit 10 does so using one of its associated switching unit controllers 12 as a gateway to network 34. Switching unit controller 12 collects and buffers message packets from service provider 14, reformats the message packets as appropriate, and transmits the message packets to a switching unit controller 12 in the switching unit 10 associated with the destination service provider 14.

Figure 2:
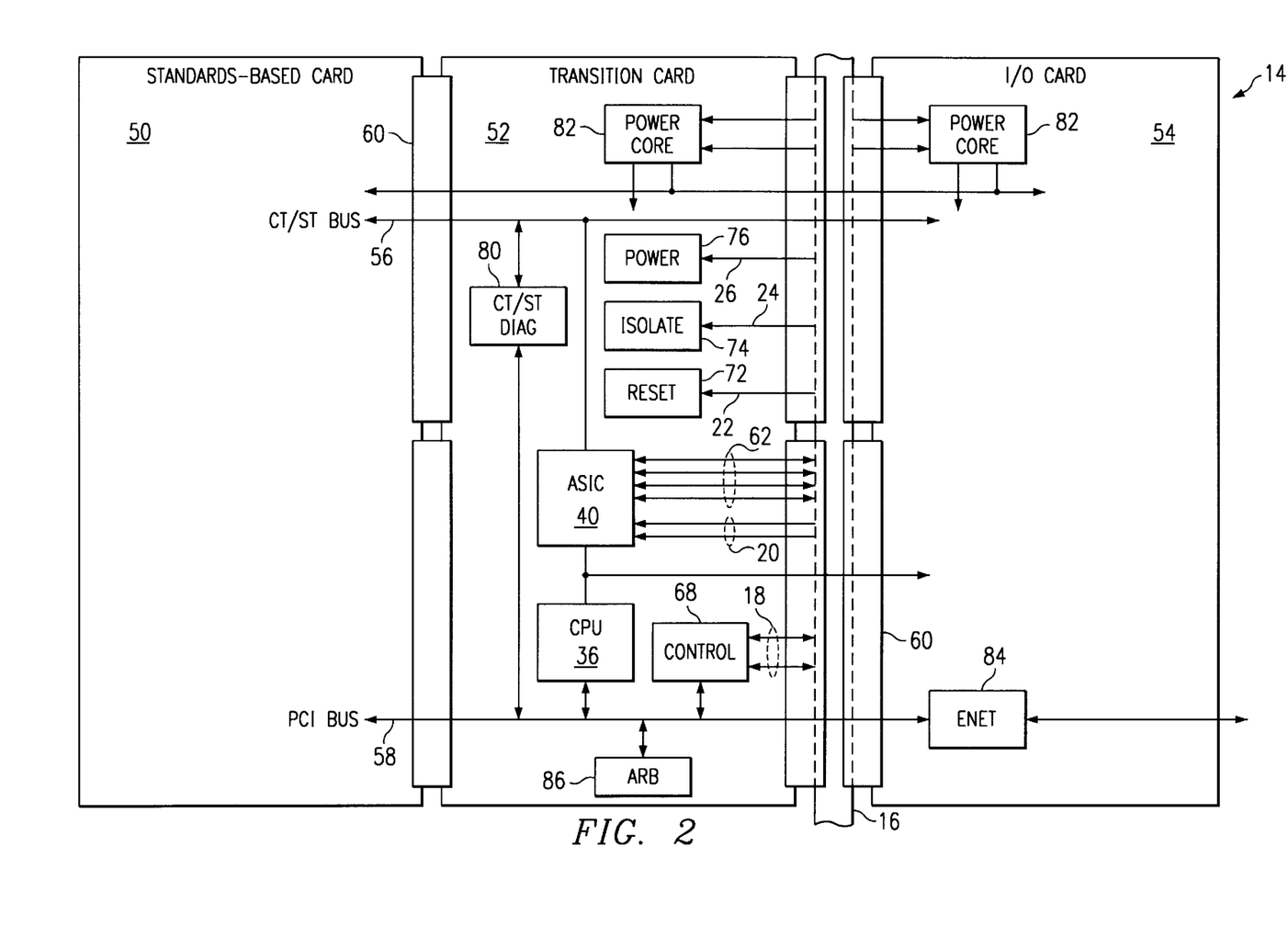
FIG. 2 illustrates an exemplary service provider incorporating a transition card according to the present invention and FIG. 3 illustrates an exemplary switching unit controller incorporating a transition card according to the present invention.

FIG. 2 illustrates an exemplary service provider 14 that includes a standardsbased or other off-the-shelf card 50, a transition card 52, and an input/output (I/O) card 54. Off-the-shelf card 50 is coupled to transition card 52 and to I/O card 50 using a Computer Telephony (CT) bus specified in the Enterprise Computer Telephony Forum (ECTF) H.110 standard, a MITEL Serial Telephony (ST) bus, or another suitable serial data bus, referred to herein as CT/ST bus 56. Off-the-shelf card 50 is further coupled to transition card 52 and I/O card 50 using a Peripheral Component Interconnect (PCI), compact PCI (cPCI), or another suitable bus 58 for communicating command, control, and administrative messages. Standards-based card 50 may be available as a stock item from one or more telecommunications equipment manufacturers, may be a custom item specifically designed and developed for a particular customer and application, or may be any other suitable standards-based card supporting bus 56, bus 58, or both buses 56 and 58 according to particular needs.

Buses 56 and 58 are generally unsuitable for operation within high availability backplane environments because of deficiencies as to redundancy, hot insertion, fault detection, fault isolation, fault recovery, and other single point of failure deficiencies, in any combination and without limitation. In general, to allow standards-based card 50 to operate in the high availability backplane environment of switching unit 10, transition card 52 transitions buses 56 and 58 into backplane 16 to suitably transition off-the-shelf card 50 into the high availability backplane environment associated with backplane 16. Transitioning standards-based card 50 includes not only coupling buses 56 and 58 to corresponding buses of transition card 52, but also providing redundancy, hot insertion, fault detection, fault isolation, and fault recovery on transition card 52 to prevent faults associated with standards-based card 50 from propagating to other components within switching unit 10. Transition card 52 may accomplish the transition using data bus 62, control bus 18, synchronization bus 20, reset bus 22, isolate bus 24, power bus 26, and protection bus 28, in any combination and without limitation. In one embodiment, data bus 62 may be particularly associated with transition of bus 56 into backplane 16 and control bus 18 may be particularly associated with transition of bus 58 into backplane 16, although one or more other buses may contribute to the success of these transitions. Standards-based card 50 and transition card 52 may be coupled using clips or other appropriate connectors 60 to form an integral field replaceable unit.

Transition card 52 supports logic and associated circuitry in control bus module 68, reset bus module 72, isolate bus module 74, and power bus module 76 to support operation of control bus 18, reset bus 22, isolate bus 24, and power bus 26, respectively. Control bus module 68 further supports aspects associated with operation of protection bus 28. In one embodiment, ASIC complex 40 includes logic and circuitry to support operation of synchronization bus 20, which may include the clock synchronization and fault protection functionality described in copending U.S. application Ser. No. 09/330,433, frame synchronization and fault protection functionality described in copending U.S. application Ser. No. 09/328,031, or both. In a particular embodiment where switching unit 10 supports TDM switching and data bus 62 is a TDM data bus, ASIC complex 40 includes logic and circuitry to support TDM switching operations associated with data bus 62. Where switching unit 10 supports 16,384 ports, data bus 62 may include four TDM data buses that are each associated with a particular ASIC device within ASIC complex 40 and a specified range of 4,096 of the 16,384 total ports.

As described more fully below, data bus 62, control bus 18, synchronization bus 20, reset bus 22, isolate bus 24, and power bus 26, in any combination and without limitation, together with associated components, cooperate to provide redundancy, hot insertion, fault detection, fault isolation, and fault recovery not found in standards-based card 50. As a result, the present invention prevents single points of failure associated with standards-based card 50 from propagating to and interrupting operation of other components in switching unit 10, helps to satisfy high availability requirements, and transitions standards-based card 50 into the high availability backplane environment associated with backplane 16. Also as described more fully below, protection bus 28, together with associated components, helps provide high availability characteristics at a system level, such that total or partial failure of a service provider 14 does not interrupt operation or degrade performance of the system as a whole.

Data Bus

In one embodiment, as described above, ASIC complex 40 may support one or more ASIC devices that are each associated with a specified range of ports associated with switching unit 10. For example only and not by way of limitation, if switching unit 10 supports 16,384 ports, ASIC complex 40 may include four ASIC devices that each provide TDM switching for 4,096 ports using a corresponding data bus 62. The ASIC devices may be cascaded or otherwise arranged such that failure of any ASIC device results at most in loss of only those ports associated with the failed ASIC device. For example, where ASIC complex 40 includes four ASIC device each supporting 4,096 of 16,384 total ports, failure of a single ASIC device may result in at most the loss of the associated 4,096 ports and a consequent twenty-five percent loss in capacity for service provider 14. In addition, where appropriate, failure of one or more ASIC devices may result in a switching unit controller 12 electrically isolating service provider 14 from switching unit controllers 12 and other service providers 14 using isolate bus 24. As a result of these and other suitable features, as described more fully in copending U.S. application Ser. No. 09/327,700, ASIC complex 40 and associated ASIC devices and data buses 62 help to prevent single points of failure from propagating and therefore help to satisfy high availability requirements.

In one embodiment, service provider 14 supports a diagnostic capability to detect faults associated with the data path through CT/ST bus 56, one or more ASIC devices of ASIC complex 40, one or more associated data buses 62, and backplane 16, providing another important technical advantage. CPU 36 generates a data pattern and transmits the data pattern through a CT/ST diagnostic module 80 onto CT/ST bus 56. CT/ST diagnostic module 80 also stores the data pattern for later comparison. An ASIC device in ASIC complex 40 receives the transmitted data pattern from CT/ST bus 56, switches and otherwise processes the data pattern as appropriate, and transmits the switched data pattern to backplane 16 using its associated data bus 62. The same or another ASIC device in ASIC complex 40 then receives the data pattern from backplane 16 using its associated data bus 62, switches and otherwise processes the data pattern, and transmits the switched data pattern using CT/ST bus 56 to CT/ST diagnostic module 80.

CT/ST diagnostic module 80 compares the received data pattern with the data pattern stored previously to confirm that the data pattern maintained its integrity while passing through an entire data path associated with one or more ASIC devices within ASIC complex 40. If data integrity has not been maintained, CPU 36 may cause the particular ASIC device or ASIC devices associated with the data path to be electrically isolated or otherwise removed from service. One or more ASIC devices within ASIC complex 40 may be evaluated in this manner with any suitable frequency during the operation of service provider 14. For example only and not by way of limitation, data patterns may be generated for diagnostic purposes with every incoming frame of data from CT/ST bus 56, once every specified number of incoming frames from CT/ST bus 56, only in response to some other indication that a fault may be present in a data path, or at any other suitable times.

In addition to isolating the particular ASIC device or ASIC devices responsible for the fault, CPU 36 may report the fault to one or both switching unit controllers 12. In response, switching unit controllers 12 may electrically isolate service provider 14 from other service providers 14 and from switching unit controllers 12 using isolate bus 24 to prevent the fault from propagating within switching unit 10. Furthermore, using protection bus 28, switching unit controllers 12 may transfer the responsibilities of the failed service provider 14 to a redundant service provider 14, such that switching unit 10 may experience little or no degradation in performance resulting from the loss of the failed service provider 14. The operation of isolate bus 24 and protection bus 28 are described more fully below. Advantages of data bus 62 are particularly apparent in contrast to bus 56, which is prone to single points of failure and does not provide an adequate combination of redundancy, hot insertion, and fault detection, isolation, and recovery capabilities.

Although not directly related to data bus 62, I/O card 54 may support a suitable 10BaseT Ethernet, 100BaseT Ethernet, or other high speed data bus module 84. High speed data bus module 84 couples an associated Ethernet or other high speed data bus to PCI bus 58 and allows CPU 36 and I/O card 54 access to the high speed data bus. High speed data bus module 84 provides data packet collection and reformatting associated with communications on the associated high speed data bus. Transition card 52 also includes a PCI bus arbiter 86 used in connection with arbitration for bus 58.

Control Bus

In one embodiment, in support of high availability requirements, control bus 18 includes redundant "A" and "B" control buses 18 each having a separate driver on each of two redundant switching unit controllers 12 as well as on each service provider 14. As a result, a failure of either redundant "A" or "B" control bus 18 does not bring down the other "B" or "A" control bus 18 and therefore does not substantially interrupt the operation or degrade the performance of switching unit 10. In operation with respect to control bus 18, CPU 36 designates a particular switching unit controller 12 as the bus master for control bus 18. Based on a command from CPU 36, the bus master, or both CPU 36 and the bus master, each service provider 14 selects a particular redundant "A" or "B" control bus 18, "A" control bus 18 as an example, to communicate command, control, and other administrative information associated with control bus 18 between switching unit controllers 12 and service providers 14. The switching unit controller 12 not selected becomes the slave. In response to the detection of a fault associated with "A" control bus 18, as described more fully below with reference to FIG. 3, service provider 14 may be instructed to or may otherwise switchover to "B" control bus 18 and continue operating substantially uninterrupted despite the fault.

In one embodiment, service provider 14 also supports a diagnostic capability to detect faults associated with bus 58, providing another important technical advantage. CPU 36 communicates with suitable components on standards-based card 50, another CPU (not shown) for example, using bus 58 to detect faults associated with bus 58. The errors may be gross, such as all message traffic ceasing on bus 58, or non-gross, such as messages on bus 58 being other than as specified in the corresponding standard. In response to detecting a fault, CPU 36 informs one or both switching unit controllers 12 and an appropriate switching unit controller 12 isolates service provider 14 using isolate bus 24 or resets service provider 14 using reset bus 26. Furthermore, using protection bus 28, an appropriate switching unit controller 12 may transfer the responsibilities of the failed service provider 14 to a redundant service provider 14, such that switching unit 10 may experience little or no degradation in performance resulting from the loss of the failed service provider 14.

Control bus 18 also supports hot insertion of switching unit controllers 12 and service providers 14 during operation of switching unit 10, using appropriate isolation integrated circuits or otherwise. As a result of these and other features, described more fully in copending U.S. application Ser. No. 09/328,171 and U.S. Pat. No. 6,425,009 control bus 18 prevents single points of failure from propagating within switching unit 10 and helps satisfy high availability requirements. Advantages of control bus 18 are particularly apparent in contrast to bus 58, which is prone to single points of failure and does not provide an acceptable combination of redundancy, hot insertion, and fault detection, isolation, and recovery capabilities. Transition card 52 provides a bridge between bus 58 and control bus 18, allowing switching unit controllers 12 and service providers 14 to communicate suitable command, control, and administrative information within the high availability backplane environment associated with backplane 16.

Synchronization Bus

In one embodiment, to support high availability requirements, synchronization bus 20 includes redundant "A" and "B" synchronization buses 20 each having separate drivers on redundant switching unit controllers 12 for frame synchronization and each having separate drivers on switching unit controllers 12 for clock synchronization. In operation as to frame synchronization, CPU 36 designates a particular switching unit controller 12 as the frame master for generating frame pulses for communication on a particular redundant "A" or "B" synchronization bus 20, "A" synchronization bus 20 as an example. The other switching unit controller 12 becomes the frame slave, generating frame pulses for communication using the other redundant "A" or "B" synchronization bus 20, "B" synchronization bus 20 in this example. The frame slave synchronizes its "B" frame pulses with the "A" frame pulses from the master. Service providers 14 are then commanded to. synchronize with the "A" frame pulses from the frame master for purposes of their internal switching operations. Transition card 52 then provides frame pulses, synchronized with the received "A" frame pulses, to standards-based card 50 for use in connection with operations of standards-based card 50.

In response to detection of a framing error or other fault associated with the selected "A" frame pulses received from the frame master on "A" synchronization bus 20, if the frame master has failed or is otherwise responsible for the fault, then service providers 14 are commanded to or may otherwise switchover to the "B" frame pulses received from the frame slave using "B" synchronization bus 20 and continue operating substantially uninterrupted despite the fault. To additionally isolate the fault, the frame master is electrically isolated from the frame slave and from service providers 14 using isolate bus 24. On the other hand, if a particular service provider 14 rather than the master has failed or is otherwise responsible for the fault, then service provider 14 is electrically isolated from both switching unit controllers 12 and other service providers 14 using isolate bus 24. Furthermore, using protection bus 28, an appropriate switching unit controller 12 may transfer the responsibilities of the failed service provider 14 to a redundant service provider 14, such that switching unit 10 may experience little or no degradation in performance resulting from failure of service provider 14.

During operation with respect to clock synchronization, CPU 36 designates a particular switching unit controller 12 as the clock master, which then generates a first system clock signal for communication using a particular one of the redundant "A" or "B" synchronization buses 20, "A" synchronization bus 20 as an example. The other switching unit controller 12 becomes the clock slave, and generates a second system clock signal for communication using the other redundant "A" or "B" synchronization bus 20, "B" synchronization bus 20 in this example. All service providers 14 are then instructed to use the "A" system clock signal from the clock master as their primary reference clock signal and to generate clock signals synchronized with the "A" system clock signal for purposes of their internal operations. Transition card 52 then provides a clock signal, synchronized with the received "A" system clock signal, to standards-based card 50 for use in connection with operations of standards-based card 50.

In response to the detection of a loss of signal or other fault associated with the "A" system clock signal received from the clock master on "A" synchronization bus 20, if the clock master has failed or is otherwise responsible for the fault, service providers 14 initiates autonomous or other suitable switchovers to the "B" system clock signal received from the clock slave using "B" synchronization bus 20 and continue operating substantially uninterrupted despite the fault. To further isolate the fault, the master is electrically isolated from the clock slave and service providers 14 using isolate bus 24. On the other hand, if a particular service provider 14 rather than the master has failed or is otherwise responsible for the fault, the service provider 14 is electrically isolated from both switching unit controllers 12 and other service providers 14 using isolate bus 24. Furthermore, using protection bus 28, an appropriate switching unit controller 12 may transfer the responsibilities of the failed service provider 14 to a redundant service provider 14, such that switching unit 10 may experience little or no degradation in performance resulting from failure of service provider 14.

Synchronization bus 20 also supports hot insertion of switching unit controllers 12 and service providers 14 during operation of switching unit 10, using appropriate isolation integrated circuits or otherwise. As a result of these and other features, as described more fully in copending U.S. application Ser. Nos. 09/328,031 and 09/330,433, synchronization bus 20 prevents single points of failure from propagating and helps to satisfy high availability requirements. The advantages of synchronization bus 20 are particularly apparent in contrast to buses 56 and 58, which are both prone to single points of failure and do not provide a suitable combination of redundancy, hot insertion, and fault detection, isolation, and recovery capabilities. In general, transition card 52 takes redundant frame pulses and system clock signals received using synchronization bus 20 and provides a single frame pulse and a single clock signal suitable for use in connection with operation of standards-based card 50.

Reset Bus

In one embodiment, to support high availability requirements, switching unit 10 includes reset bus 22 that either or both of the switching unit controllers 12 may drive according to particular needs. The present invention contemplates reset bus 22 having redundant "A" and "B" reset buses 22, each with a separate driver on one of the two redundant switching unit controllers 12. In operation with respect to reset bus 22, switching unit controller 12 transmits a reset code to a selected service provider 14, in addition to one or more other service providers 14, using reset bus 22 to cause the selected service provider 14 to reset itself. To enable the reset event, the switching unit controller 12 must transmit a reset strobe signal substantially simultaneous with or otherwise temporally associated with the reset code using reset bus 22. Physically separate integrated circuit devices or other drivers on switching unit controller 12 are used to transmit the reset code and reset strobe signal. Since the service provider 14 must receive both the reset code and the enabling strobe signal to execute the reset event, a fault associated with switching unit controller 12 or reset bus 22 that might otherwise cause an undesirable reset of service provider 14 is prevented from propagating. If the appropriate reset code and enabling strobe are received at service provider 14, transition card 52 sends a reset command to standards-based card 50.

If service provider 14 receives the reset code but does not receive the enabling strobe, indicating a fault associated with the switching unit controller 12 that sent the reset code or with reset bus 22, service provider 14 reports to CPU 36 and continues to operate substantially uninterrupted despite the fault. To further isolate the fault, the switching unit controller 12 transmitting the reset code is electrically isolated from the other switching unit controller 12 and service providers 14 using isolate bus 24. In the alternative, if service provider 14 receives the reset code and the enabling strobe signal but does not execute the reset event, indicating a fault associated with service provider 14, then service provider 14 is electrically isolated from switching unit controllers 12 and the other service providers 14 using isolate bus 24. Furthermore, using protection bus 28, an appropriate switching unit controller 12 may transfer the responsibilities of the failed service provider 14 to a redundant service provider 14, such that switching unit 10 may experience little or no degradation in performance resulting from the loss of the failed service provider 14.

Reset bus 22 also supports the hot insertion of switching unit controllers 12 and service providers 14 during operation of switching unit 10, using appropriate isolation integrated circuits or otherwise. As a result of these and other features, described more fully in copending U.S. application Ser. No. 09/328,173, reset bus 22 helps prevent single points of failure from propagating and helps satisfy high availability requirements. The benefits of reset bus 22 may be particularly apparent in contrast to buses 56 and 58, which are prone to single points of failure and do not provide an adequate combination of redundancy, hot insertion, and fault detection, isolation, and recovery capabilities. In general, transition card 52 translates the high availability reset capabilities associated with reset bus 22 to a standard reset command suitable for use in connection with the operation of standards-based card 50.

Isolate Bus

In one embodiment, to support high availability requirements, switching unit 10 includes isolate bus 24 that either or both of the switching unit controllers 12 may drive according to particular needs. The present invention contemplates isolate bus 24 with redundant "A" and "B" isolate buses 24, each having a separate driver on one of two redundant switching unit controllers 12. In operation with respect to isolate bus 24, switching unit controller 12 transmits an isolate code to a selected service provider 14, in addition to one or more other service providers 14, using isolate bus 24 to cause the selected service provider 14 to isolate itself. To enable the isolate event, switching unit controller 12 must transmit an isolate strobe signal substantially simultaneous to or otherwise temporally associated with the isolate code using isolate bus 24. Physically separate integrated circuit devices or other drivers on switching unit controller 12 are used to transmit the isolate code and isolate strobe signal. Since the selected service provider 14 must receive both the isolate code and the enabling strobe signal to execute the isolate event, a fault associated with switching unit controller 12 or isolate bus 24 that might otherwise cause undesirable isolation of service provider 14 is prevented from propagating.

If service provider 14 receives the isolate code but does not receive the enabling strobe, indicating a fault associated with the switching unit controller 12 that sent the isolate code or with isolate bus 24, service provider 14 reports this fact and continues to operate substantially uninterrupted despite the fault. To further isolate the fault, the switching unit controller 12 transmitting the isolate code may be electrically isolated from the other switching unit controller 12 and from service providers 14 using isolate bus 24. Alternatively, if service provider 14 receives the isolate code and the enabling strobe signal but does not execute the isolate event, indicating a fault associated with service provider 14, then service provider 14 is electrically isolated from switching unit controllers 12 and from other service providers 14 using isolate bus 24. Furthermore, using protection bus 28, an appropriate switching unit controller 12 may transfer the responsibilities of the failed service provider 14 to a redundant service provider 14, such that switching unit 10 may experience little or no degradation in performance resulting from the loss of the failed. service provider 14.

Isolate bus 24 supports hot insertion of switching unit controllers 12 and service providers 14 during operation of switching unit 10, using suitable isolation integrated circuits or otherwise. As a result of these and other features, as described more fully in U.S. Pat. No. 6,434,703, isolate bus 24 prevents single points of failure from propagating and helps satisfy high availability requirements. Benefits of isolate bus 22 may be particularly apparent in contrast to buses 56 and 58, which are prone to single points of failure and do not provide an appropriate combination of redundancy, hot insertion, and fault detection, isolation, and recovery capabilities. In general, the high availability isolate capabilities associated with isolate bus 24 prevent faults associated with standards-based card 50 or transition card 52 from propagating to other components within switching unit 10.

Power Bus

In one embodiment, to support high availability requirements, switching unit 10 includes power bus 26 that either or both of the switching unit controllers 12 may drive according to particular needs. The present invention contemplates power bus 26 with redundant "A" and "B" power buses 26, each having a separate driver on one of two redundant switching unit controllers 12. In operation with respect to power bus 26, switching unit controller 12 transmits a power code to a selected service provider 14, in addition to one or more other service providers 14, using power bus 26 to cause the selected service provider 14 to transition its power state. As an example, service provider 14 may be commanded to power on to transition from on "off" to an "on" power state or may be commanded to power off to transition from an "on" to an "off" power state. To enable a power event, switching unit controller 12 must also transmit a power strobe signal substantially simultaneous with or otherwise temporally associated with the power code using power bus 26. Physically separate integrated circuit devices or other drivers in switching unit controller 12 are used to transmit the power code and the power strobe signal. Because service provider 14 must receive both the power code and an enabling strobe signal before executing the power event, a fault associated with switching unit controller 12 or power bus 26 that might otherwise cause an undesirable power state transition of service provider 14 is prevented from propagating.

If service provider 14 receives the power code but does not receive the enabling strobe, indicating a fault associated with the switching unit controller 12 that sent the power code or with power bus 26, service provider 14 reports this and continues its operations substantially uninterrupted despite the fault. To further isolate the fault, the switching unit controller 12 transmitting the power code is electrically isolated from the other switching unit controller 12 and service providers 14 using isolate bus 24. In the alternative, if service provider 14 receives the power code and an enabling strobe signal but does not execute the power event, indicating a fault associated with service provider 14, the service provider 14 is electrically isolated from switching unit controllers 12 and from other service providers 14 using isolate bus 24. Furthermore, using protection bus 28, an appropriate switching unit controller 12 may transfer the responsibilities of the failed service provider 14 to a redundant service provider 14, such that switching unit 10 may experience little or no degradation in performance resulting from the loss of the failed service provider 14.

Power bus 26 also supports the hot insertion of switching unit controllers 12 and service providers 14 during operation of switching unit 10, using appropriate isolation integrated circuits or otherwise. As a result of these and other features, described more fully in copending U.S. application No. Ser. 09/328,173, power bus 26 helps prevent single points of failure from propagating and helps satisfy high availability requirements. The benefits of power bus 22 may be particularly apparent in contrast to buses 56 and 58, which are prone to single points of failure and do not provide a suitable combination of redundancy, hot insertion, and fault detection, isolation, and recovery capabilities.

Reset bus 22, isolate bus 24, and power bus 26 may each be referred to more generally as an event bus with an associated event code and enabling event strobe signal, both of which must be received for the corresponding event to be executed.

In one embodiment, transition card 52 provides its own power conditioning and conversion functionality. Input power to transition card 52 is from redundant 48V(dc) or other suitable power supply lines associated with backplane 16. Transition card 52 "soft starts" using one or both of 48V(dc) inputs when transition card 52 is inserted into switching unit 10 or otherwise will begin operating, meaning that the in-rush of current to transition card 52 is controlled such that it does not exceed a specified Amperes per second (A/s) threshold. This helps to prevent an undesirable voltage drop on backplane 16 or within the associated backplane environment, since too large a voltage drop may result in total or partial failure of transition card 52. Transition card 52 "sums" its two 48V(dc) inputs and provides the summed voltage to the power conversion circuitry in power core 76, This allows transition card 52 to continue operating if either or both 48V(dc) inputs are active and prevents transition card 52 from being damaged if one 48V(dc) input is disconnected for any length of time. Although redundant 48V(dc) inputs are discussed, the present invention contemplates any suitable power inputs for transition card 52.

Transition card 52 may perform its own power conversion to voltages that are suitable to support the functionality associated with transition card 52 and off-the-shelf card 50. In one embodiment, these voltages are specified to provide optimum power dissipation on transition card 52, for example only and not by way of limitation, power dissipation on transition card 52 of less than 50W. In a more particular embodiment, power core 82 of transition card 52 supports power conversion to approximately 3.3V, approximately 5.0V, and approximately +/−12V, singly or in any suitable combination, depending on functionality being supplied. Power core 82 of I/O card 54 may cooperate with or merely receive power from power core 82 of transition card 52.

Protection Bus

In one embodiment, to support high availability requirements, protection bus 28 cooperates with control bus 16 to provide the ability of a redundant protection service provider 14 to assume the responsibilities of a failed protected service provider 14, such that switching unit 10 continues to operate substantially uninterrupted and with little or no degradation in performance as a result of the failure. One or more protection service providers 14 may each protect one or more other service providers 14 in an associated protection group according to particular needs. For example, where each protection service providers 14 protects a single service provider 14, switching unit 10 may provide 1+1 redundancy using protection bus 28. Where each protection service providers 14 protects N service providers 14, switching unit 10 may provide N+1 redundancy using protection bus 28. Analogously, where X protection service providers 14 cooperate to protect N service providers 14, switching unit 10 may provide N+X redundancy using protection bus 28. The present invention contemplates protection bus 28 operating to help protect one or more service providers 14 using any suitable redundancy scheme associated with switching unit 10

In operation, a protection service provider 14 receives command, control, and administrative messages also destined for its protected service providers 14 using control bus 18. I/O module 30 for each protected service provider 14 is instructed to selectively communicate the data received from the associated network interface to its protected service provider 14. Each protected service provider 14 transmits a periodic or other suitable watchdog signal to associated I/O module 30. If the watchdog signal ceases or is otherwise modified, which indicates a fault associated with service provider 14, I/O module 30 detects the modification and reports the failure to the appropriate protection service provider 14 using protection bus 28. In response, protection service provider 14 assumes some or all of the responsibilities of failed service provider 14 and begins communicating data with the I/O module 30 of failed service provider 14 using an associated protection I/O module 30 and protection bus 28. I/O module 30 begins to selectively communicate the data received from the associated network interface to the protection card through protection bus 28 and protection I/O module 30. After failed service provider 14 has been replaced, repaired, or otherwise returned to service, the protection service provider 14 instructs I/O module 30 to again selectively communicate the data received from the associated network interface to the formerly failed service provider 14 rather than to protection service provider 14.

Benefits of protection bus 28 may be particularly apparent in contrast to buses 56 and 58, which are prone to single points of failure and do not provide an acceptable combination of redundancy, hot insertion, and fault detection, isolation, and recovery capabilities. In general, the high availability protection switching capabilities that are associated with protection bus 28 helps prevent faults associated with standards-based card 50 or transition card 52 from propagating to other components of switching unit 10 and therefore contributes to the ability of standards-based card 50 to operate within the high availability backplane environment of switching unit 10. Operation of protection bus 28 and selected related components is described more fully in copending U.S. application Ser. No. 09/327,971.

Figure 3:
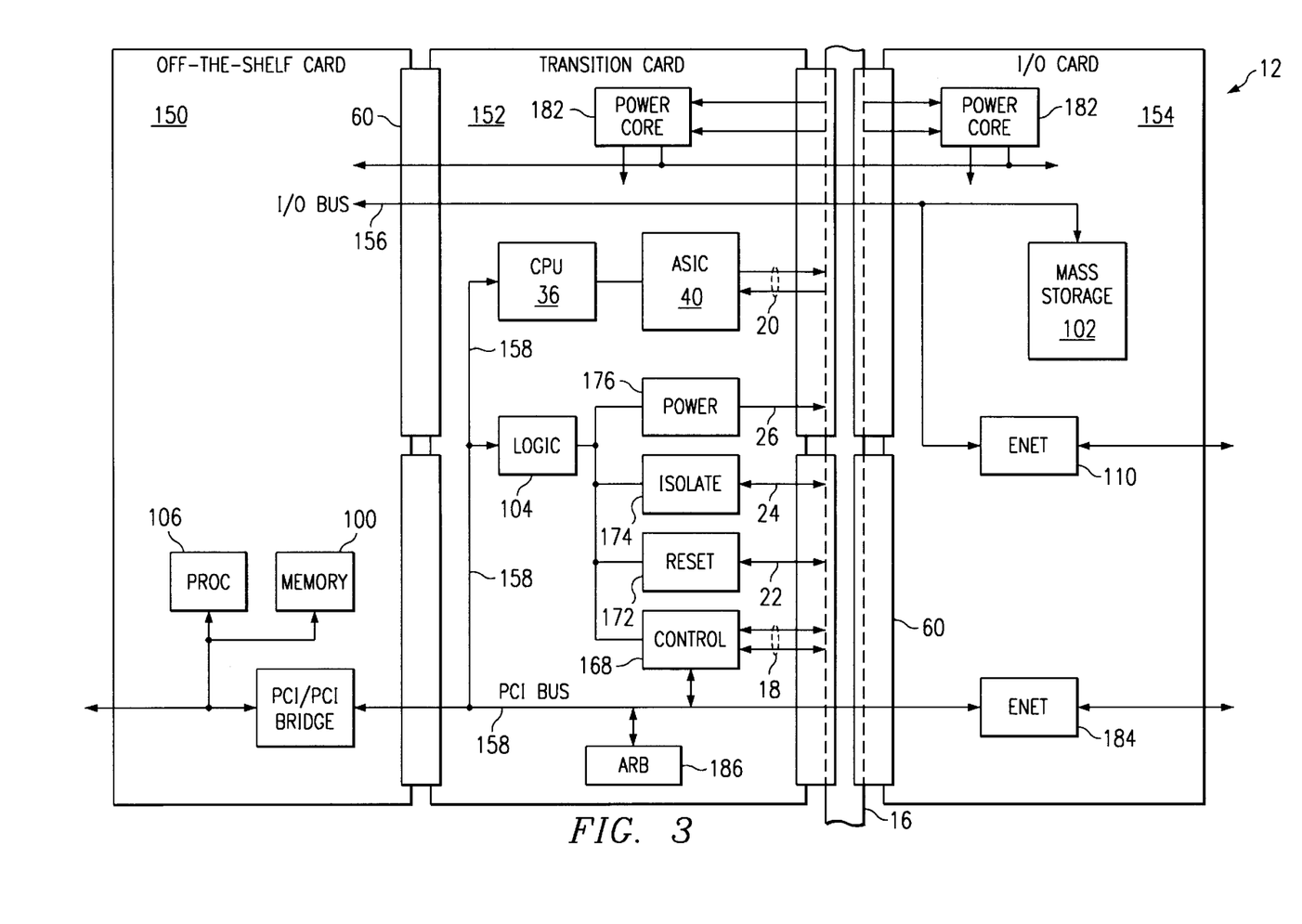

FIG. 3 illustrates an exemplary switching unit controller 12 in accordance with the present invention. Analogous to service provider 14, switching unit controller 12 includes a standards-based or other off-the-shelf card 150, a transition card 152, and an I/O and mass storage card 154. Off-the-shelf card 150 is coupled to transition card 152 and to I/O card 154 using an I/O bus 156 and a PCI, cPCI, or other suitable bus 158 for communicating command, control, and administrative messages. Like off-the-shelf card 50 of service provider 14, off-the-shelf card 150 may be available as a stock item from one or more telecommunications equipment manufacturers, may be a custom item designed and developed for a particular customer and application, or may be any other appropriate card supporting bus 156, bus 158, or both buses 156 and 158 according to particular needs. In one embodiment, off-the-shelf card 150 is a commercially available processor card supporting an INTEL-based or other processor 106 having an associated memory 100 and running WINDOWS NT or another suitable commercially available operating system.

Like bus 58 discussed above with reference to FIG. 2, bus 158 is prone to failures and is generally unsuitable for operation in high availability environments due to deficiencies with respect to redundancy, hot insertion, fault detection, fault isolation, fault recovery, and other single point of failure deficiencies, in any combination and without limitation. Furthermore, processor 106 is prone to failure and is therefore also generally unsuitable for operation within high availability environments. In general, transition card 152 transitions or otherwise provides a buffer between standards-based card 150 and the high availability backplane environment associated with backplane 16 to allow standards-based card 150 to suitably operate in this high availability backplane environment. In one embodiment, CPU 36 of transition card 52 supports VXWORKS or another suitable embedded real-time operating system targeted for high availability applications.

Transitioning standards-based card 150 includes not only coupling bus 158 and processor 106 to corresponding buses and components of transition card 152, but also providing redundancy, hot insertion, fault detection, fault isolation, and fault recovery using transition card 152 to prevent faults associated with standards-based card 150 from propagating to other components within switching unit 10. Transition card 152 may accomplish the transition using control bus 18, synchronization bus 20, reset bus 22, isolate bus 24, power bus 26, and protection bus 28, in any suitable combination and without limitation. In one embodiment, control bus 18 may be particularly associated with the transition of bus 158 into backplane 16, although one or more other buses may contribute to the success of the transition. Standards-based card 150 and transition card 152 may be coupled using clips or other suitable connectors 60 to form an integral field replaceable unit.

At least some of the operation of switching unit controllers 12 with respect to control bus 18, synchronization bus 20, reset bus 22, isolate bus 24, power bus 26, and protection bus 28 is described above with reference to FIG. 2. However, switching unit controllers 12 may include additional or different functionality to that of service providers 14 in some cases, as described more fully below.

As to control bus 18, each switching unit controller 12 includes a control bus monitor within control bus module 168 that monitors the health of "A" and "B" control buses 18 and may initiate a test procedure in an attempt to confirm any reported faults associated with "A" and "B" control buses 18. During operation of switching unit 10, assuming that "A" control bus 18 has been selected in the manner described above, both control bus monitors may independently determine that "A" control bus 18 has failed, inform one another, initiate a switchover to the redundant "B" control bus 18, and then command service providers 14 to begin using "B" control bus 18. Alternatively, if one control bus monitor determines that "A" control bus 18 has failed but the other monitor does not, the monitor that did not detect a fault transmits a test signal using "A" control bus 18 to attempt to confirm the fault the other monitor detected. Since unnecessary switchovers are generally undesirable, providing a mechanism to confirm the detection of a fault before initiating a switchover to "B" control bus 18 provides an important technical advantage.

If a proper result is obtained in response to the test signal, confirming that "A" control bus 18 is indeed not functioning properly, the control bus monitor that sent the test signal informs the other monitor of its confirmation and the monitors cooperate to initiate a switchover to "B" control bus 18. If a proper result is obtained in response to this test signal, however, indicating that "A" control bus 18 is functioning properly but the other control bus monitor and therefore its switching unit controller 12 is not, the monitor that sent the test signal informs CPU 36. In response, CPU 36 commands the properly functioning switching unit controller 12 to isolate the failed switching unit controller 12 using isolate bus 24. As a result, the failure is prevented from propagating and switching unit 10 is allowed to continue operating substantially uninterrupted and with little or no degradation in performance despite the failure.

In one embodiment, like service provider 14, switching unit controller 12 also supports a diagnostic capability to detect faults associated with bus 158, providing an important technical advantage. CPU 36 communicates with processor 106 or another suitable component on standards-based card 150 using bus 158 to detect faults associated with bus 158. The errors may be gross, such as all message traffic ceasing on bus 158, or non-gross, such as messages on bus 158 being other than in accordance with the corresponding standard. In response to detecting a fault, CPU 36 informs at least the other switching unit controller 12 and may allow the other switching unit controller 12 to isolate the failed switching unit controller 12 using isolate bus 24 or reset the failed switching unit controller 12 using reset bus 26. The present invention contemplates a failed switching unit controller 12 being able to isolate itself from the other switching unit controller and from service providers 14 using isolate bus 24 or in another suitable manner.

In one embodiment, although either switching unit controller 12 may reset the other switching unit controller 12 using reset bus 22 or isolate the other switching unit controller 12 using isolate bus 24 according to particular needs, both switching unit controllers 12 are always powered on while switching unit 10 is in operation, such that neither switching unit controller 12 may power the other switching unit controller 12 off using power bus 26.

Switching unit controller 12 includes an ASIC or other suitable programmable logic device 104 that includes logic and circuitry associated with various aspects of the operation of control bus module 168, reset bus module 172, isolate bus module 174, and power bus module 176. CPU 36 operates with ASIC complex 40 to provide frame synchronization, clock synchronization, and associated fault protection functionality as described above with reference to FIG. 2. Because ASIC complex 40 of switching unit controller 12 is not directly involved in TDM or other switching operations in one embodiment, ASIC complex 40 of switching unit controller 12 need not support a data bus analogous to data bus 62.

Similar to I/O card 54 of service provider 14, I/O and mass storage card 154 of switching unit controller 12 supports a suitable 10BaseT Ethernet, 100BaseT Ethernet, or other high speed data bus module 184. Module 184 couples an associated high speed Ethernet or another high speed data bus to PCI bus 158 and provides processor 106 and the I/O and mass storage card 154 with access to this high speed data bus. Module 184 provides data packet collection and re-formatting associated with communications over the high speed data bus. Transition card 152 also includes a local PCI bus arbiter 186 used in connection with arbitration for bus 158. I/O and mass storage card 154 further supports mass storage 102, which may be a hard disk or any other appropriate mass storage, and a 10BaseT Ethernet, 100BaseT Ethernet, or other CT/ST bus server 110. Any suitable components of switching unit controller 12 may cooperate with transition card 152 in transitioning standards-based card 150 into the high availability backplane environment associated with backplane 16.

Although the present invention has been described with several embodiments, a plethora of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A telecommunications device, comprising:
   a backplane with an associated high availability backplane environment; and
   a transition card coupled to the backplane, the transition card being operable to transition a standards-based card supporting a Peripheral Component Interconnect (PCI) administrative bus into the high availability backplane environment, wherein the transition card supports a control bus, a synchronization bus, a reset bus, an isolate bus, and a power bus that each support at least one high availability characteristic not associated with the PCI bus.

2. A telecommunications device, comprising:
   a backplane with an associated high availability backplane environment; and
   a transition card coupled to the backplane, the transition card being operable to transition a standards-based card supporting a Peripheral Component Interconnect (PCI) administrative bus into the high availability backplane environment, wherein the standards-based card further supports a serial data bus selected from the group consisting of a Computer Telephony bus and a Serial Telephony bus, the transition card further operable to transition the serial data bus into the high availability backplane environment.

3. The device of claim 2, wherein the device is a time-division multiplexing (TDM) switching unit and the backplane is a TDM backplane.

4. The device of claim 2, wherein the transition card provides at least some redundancy, hot insertion, fault detection, fault isolation, and fault recovery capabilities not associated with the PCI bus.

5. The device of claim 2, wherein the standards-based card further supports an INTEL-based processor running a WINDOWS operating system, the transition card further operable to transition the processor and operating system into the high availability backplane environment.

6. The device of claim 2, wherein the transition card further comprises a plurality of time-division multiplexing (TDM) data buses and associated applicationspecific integrated circuit (ASIC) devices, each ASIC device being operable to switch data from the serial data bus and to communicate the switched data to one or more other cards in the device using the associated TDM data bus and the backplane, wherein a fault associated with one ASIC device or its associated TDM data bus is isolated from the other ASIC devices and their associated TDM data buses.

7. The device of claim 2, further comprising first and second control buses coupling the transition card to one or more other cards in the device, the device operable to switchover to the second control bus in response to a fault associated with the first control bus and to isolate the source of the fault.

8. The device of claim 2, further comprising the standards-based card, the standards-based card and the transition card operable to be coupled together to form a field replaceable unit.

9. A telecommunications device, comprising:
   a backplane with an associated high availability backplane environment;
   a transition card coupled to the backplane, the transition card being operable to transition a standards-based card supporting a Peripheral Component Interconnect (PCI) administrative bus into the high availability backplane environment; and
   at least one event bus coupling the transition card to one or more other cards in the device, the device operable to detect a fault associated with the event bus and to isolate the source of the fault, wherein.the event bus is selected from the group consisting of:
   a reset bus;
   an isolate bus; and
   a power bus.

10. A telecommunications device, comprising:
    a backplane with an associated high availability backplane environment;
    a transition card coupled to the backplane, the transition card being operable to transition a standards-based card supporting a Peripheral Component Interconnect (PCI) administrative bus into the high availability backplane environment, wherein the transition card further comprises a power core operable to receive first and second power inputs and to sum the inputs to supply power to components of the transition card, the components operable to continue operating substantially uninterrupted despite loss of either the first or the second input.

11. A transition card for operation in a telecommunications device having a backplane and an associated high availability backplane environment, wherein:
    the transition card is coupled to the backplane; and
    the transition card is operable to transition a standards-based card supporting a Peripheral Component Interconnect (PCI) administrative bus into the high availability backplane environment, wherein the transition card supports a control bus, a synchronization bus, a reset bus, an isolate bus, and a power bus that each support at least one high availability characteristic not associated with the PCI bus.

12. A transition card for operation in a telecommunications device having a backplane and an associated high availability backplane environment, wherein:
    the transition card is coupled to the backplane; and
    the transition card is operable to transition a standards-based card supporting a Peripheral Component Interconnect (PCI) administrative bus into the high avai lability backplane environment, wherein the standards-based card further supports a serial data bus selected from the group consisting of a Computer Telephony bus and a Serial Telephony bus and the transition card is further operable to transition the serial data bus into the high availability backplane environment.

13. The card of claim 12, wherein the device is a time-division multiplexing (TDM) switching unit and the backplane is a TDM backplane.

14. The card of claim 12, wherein the transition card provides at least some redundancy, hot insertion, fault detection, fault isolation, and fault recovery capabilities not associated with the PCI bus.

15. The card of claim 12, wherein:
the standards-based card further supports an INTEL-based processor running a WINDOWS operating system; and
the transition card is further operable to transition the processor and operating system into the high availability backplane environment.

16. The card of claim 13, wherein:
the transition card further comprises a plurality of time-division multiplexing (TDM) data buses and associated application-specific integrated circuit (ASIC) devices, each ASIC device operable to switch data from the serial data bus and to communicate the switched data to one or more other cards in the device using the associated TDM data bus and the backplane; and
a fault associated with one ASIC device or its associated TDM data bus is isolated from the other ASIC devices and their associated TDM data buses.

17. The card of claim 12, wherein:
the transition card comprises a control bus monitor and is operable to couple to first and second control buses; and
the monitor is operable to detect a fault associated with the first control bus and to help initiate a switchover to the second control bus in response to the fault.

18. The card of claim 12, wherein the transition card is operable to couple to the standards-based card to form a field replaceable unit.

19. A transition card for operation in a telecommunications device having a backplane and an associated high availability backplane environment, wherein:
the transition card is coupled to the backplane;
the transition card is operable to transition a standards-based card supporting a Peripheral Component Interconnect (PCI) administrative bus into the high availability backplane environment;
the transition card is operable to couple to an event bus;
the transition card must receive an event code and an enabling event strobe to execute a corresponding event:
the transition card is operable to report a fault if the event strobe is not received in association with the event code; and
the event bus is selected from the group consisting of a reset bus, an isolate bus, and a power bus.

20. A transition card for operation in a telecommunications device having a backplane and an associated high availability backplane environment, wherein:
the transition card is coupled to the backplane;
the transition card is operable to transition a standards-based card supporting a Peripheral Component Interconnect (PCI) administrative bus into the high availability backplane environment, wherein the transition card further comprises a power core operable to receive first and second power inputs and to sum the inputs to supply power to components of the transition card, the components operable to continue operating substantially uninterrupted despite loss of either the first or the second input.

21. A method for transitioning a standards-based card into a high availability backplane environment of a telecommunications device, the device having an associated backplane, the method comprising:
transitioning messages received from a Peripheral Component Interconnect (PCI) administrative bus associated with the standards-based card to control bus messages for communication in the high availability backplane environment; and
transitioning a serial data bus associated with the standards-based card, and selected from the group consisting of a Computer Telephony bus and a Serial Telephony bus, into the high availability backplane environment.

22. The method of claim 21, wherein the backplane is a TDM backplane and the device is a time-division multiplexing (TDM) switching unit.

23. The method of claim 21, further comprising using a high availability capability not associated with the PCI bus, wherein the capability is selected from the group consisting of redundancy, hot insertion, fault detection, fault isolation, and fault recovery.

24. The method of claim 21, further comprising transitioning an INTEL-based processor running a WINDOWS operating system into the high availability backplane environment.

25. The method of claim 21, further comprising:
switching data from the serial data bus using an application-specific integrated circuit (ASIC) device an associated time-division multiplexing (TDM) data bus;
communicating the switched data in the high availability backplane environment; and
isolating a fault associated with the ASIC device or its associated TDM data bus from one or more other ASIC devices and associated TDM data buses.

26. The method of claim 21, further comprising:
detecting a fault associated with a first redundant control bus; and
helping to initiate a switchover to a second redundant control bus in response to the fault.

27. The method of claim 21, further comprising coupling the standards-based card to a transition card to form a field replaceable unit.

28. A method for transitioning a standards-based card into a high availability backplane environment of a telecommunications device, the device having an associated backplane, the method comprising:
transitioning messages received from a Peripheral Component Interconnect (PCI) administrative bus associated with the standards-based card to control bus messages for communication in the high availability backplane environment;
executing an event if a corresponding event code and enabling event strobe are received;
reporting a fault if the event strobe is not received in association with the event code; and
wherein the event is selected from the group consisting of a reset event, an isolate event, and a power event.

29. A method for transitioning a standards-based card into a high availability backplane environment of a telecommunications device, the device having an associated backplane, the method comprising:

transitioning messages received from a Peripheral Component Interconnect (PCI) administrative bus associated with the standards-based card to control bus messages for communication in the high availability backplane environment;

receiving first and second power inputs;

summing the inputs to supply power to components of the transition card; and the components continuing to operate substantially uninterrupted.despite loss of either the first or the second input.

30. Logic for transitioning a standards-based card into a high availability backplane environment of a telecommunications device, the device having an associated backplane, the logic encoded in media and operable to:

transition messages received from a Peripheral Component Interconnect (PCI) administrative bus associated with the standards-based card to control bus messages for communication in the high availability backplane environment; and transition a serial data bus associated with the standards-based card, and selected from the group consisting of a Computer Telephony bus and a Serial Telephony bus, into the high availability backplane environment.

31. The logic of claim 30, wherein the backplane is a TDM backplane and the device is a time-division multiplexing.(TDM) switching unit.

32. The logic of claim 30, further operable to use a high availability capability not associated with the PCI bus, wherein the capability is selected from the group consisting of redundancy, hot insertion, fault detection, fault isolation, and fault recovery.

33. The logic of claim 30, further operable to transition an INTEL-based processor running a WINDOWS operating system into the high availability backplane environment.

34. The logic of claim 30, further operable to:

switch data from the serial data bus using an application-specific integrated circuit (ASIC) device an associated time-division multiplexing (TDM) data bus;

communicate the switched data in the high availability backplane environment; and isolate a fault associated with the ASIC device or its associated TDM data bus from one or more other ASIC devices and associated TDM data buses.

35. The logic of claim 30, further operable to:

detect a fault associated with a first redundant controlbus; and help to initiate a switchover to a second redundant control bus in response to the fault.

36. The logic of claim 30, further operable to couple the standards-based card to a transition card to form a field replaceable unit.

37. The method of claim 28, further comprising coupling the standards-based card to a transition card to form a field replaceable unit.

38. The method of claim 29, further comprising coupling the standards-based card to a transition card to form a field replaceable unit.

39. Logic for transitioning a standards-based card into a high availability backplane environment of a telecommunications device, the device having an associated backplane, the logic encoded in media and operable to:

transition messages received from a Peripheral Component Interconnect (PCI) administrative bus associated with the standards-based card to control bus messages for communication in the high availability backplane environment;

execute an event if a corresponding event code and enabling event strobe are received;

report a fault if the event strobe is not received in association with the event code; and wherein the event is selected from the group consisting of a reset event, an isolate event, and a power event.

40. Logic for transitioning a standards-based card into a high availability backplane environment of a telecommunications device, the device having an associated backplane, the logic encoded in media and operable to:

transition messages received from a Peripheral Component. Interconnect (PCI) administrative bus associated with the standards-based card to control bus messages for communication in the high availability backplane environment;

receive first and second power inputs;

sum the inputs to supply power to components of the transition card; and the components continuing to operate substantially uninterrupted despite loss of either the first or the second input.

41. A transition card for operation in a telecommunications device having a backplane and an associated high availability backplane environment, wherein:

the transition card is coupled to the backplane; and the transition card comprises means for transitioning a standards-based card supporting a Peripheral Component Interconnect (PCI) administrative bus into the high availability backplane environment and means for transitioning a serial data bus associated with the standards-based card, and selected from the group consisting of a Computer Telephony bus and a Serial Telephony bus, into the high availability backplane environment.

* * * * *

UNITED STATES PATENT AND TRADEMARK OFFICE
CERTIFICATE OF CORRECTION

PATENT NO.   : 6,614,752 B1
DATED        : September 2, 2003
INVENTOR(S)  : Brent K. Parrish et al.

It is certified that error appears in the above-identified patent and that said Letters Patent is hereby corrected as shown below:

<u>Column 18,</u>
Line 1, after "associated" delete "applicationspecific" and insert
-- application specific --.

<u>Column 19,</u>
Line 21, after "claim" delete "13" and insert -- 12 --.

<u>Column 21,</u>
Line 50, after "redundant" delete "controlbus" and insert
-- control bus --.

Signed and Sealed this

Twenty-third Day of March, 2004

JON W. DUDAS
*Acting Director of the United States Patent and Trademark Office*